Dec. 3, 1968 M. I. ROSE ET AL 3,414,154
COVER RING AND LEVELING SCREW ASSEMBLY FOR UNDERFLOOR
WIRING DUCT JUNCTION BOX
Filed May 16, 1967
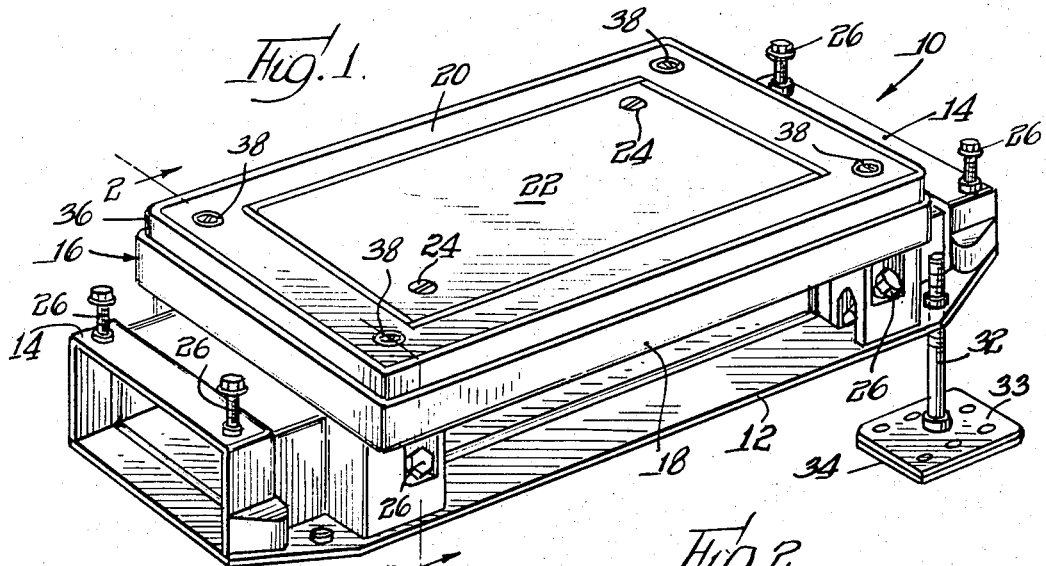
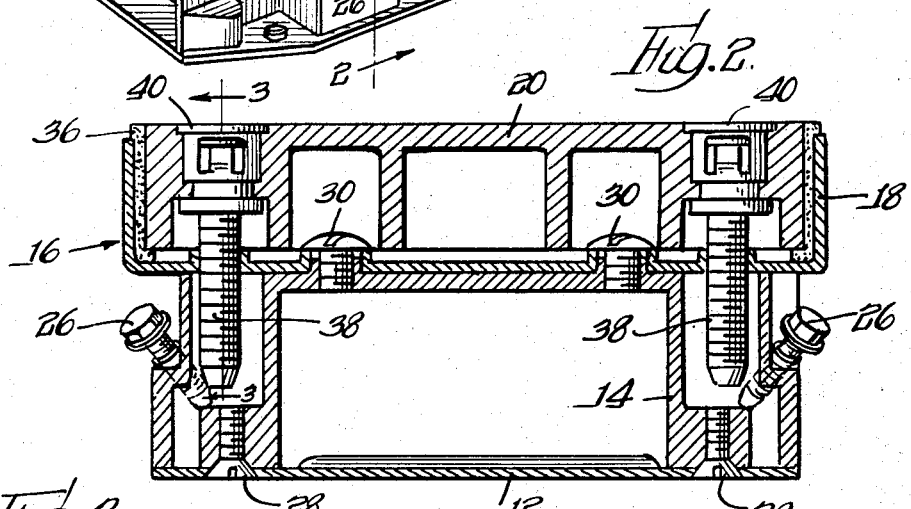
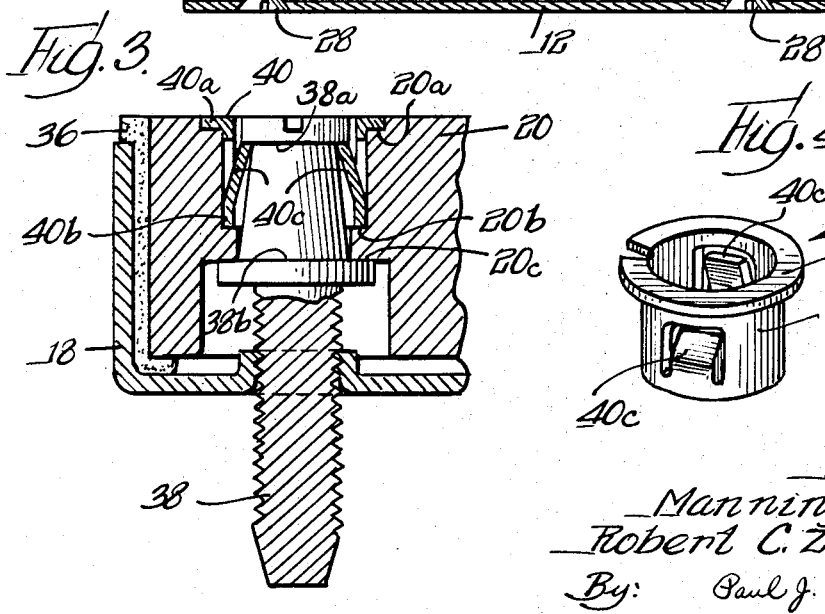
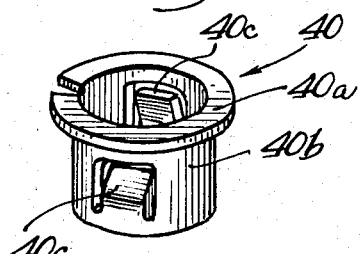
Inventors
Manning I. Rose
Robert C. Zimmerman
By: Paul J. Rose Atty.

United States Patent Office 3,414,154
Patented Dec. 3, 1968

3,414,154
COVER RING AND LEVELING SCREW ASSEMBLY FOR UNDERFLOOR WIRING DUCT JUNCTION BOX
Manning I. Rose, Dayton, Ohio, and Robert C. Zimmerman, San Jose, Calif., assignors to Square D Company, Park Ridge, Ill., a corporation of Michigan
Filed May 16, 1967, Ser. No. 638,923
9 Claims. (Cl. 220—3.7)

ABSTRACT OF THE DISCLOSURE

A cover ring and leveling screw assembly for an underfloor wiring duct junction box, the leveling screws being permanently assembled with the cover ring by snap-in retainers.

Description of the prior art

Formerly cover rings were secured against integral collars on leveling screws by special slotted round nuts, as shown in U.S. Patent Nos. 3,104,774 and 3,282,298. When a customer ordered junction boxes each with its cover ring adjusted to a height other than its fully lowered position and the leveling screws were correspondingly adjusted, and it was desired to tighten the nuts, two tools were required, one to hold the screws in position and the other to tighten the nuts. Such a procedure is too time-consuming for a mass production process. Further, if the special nuts were removed at the job site, they were subject to being lost.

Summary of the invention

In accordance with this invention, the cover ring of a junction box is permanently assembled to its leveling screws by snap-in retainers. Only one tool is required to adjust the height of the cover ring, and there are no nuts subject to being lost from the leveling screws.

Brief description of the drawing

FIG. 1 is a perspective view of a junction box having a cover ring and leveling screw assembly constructed in accordance with the invention;

FIG. 2 is a sectional view taken generally along the line 2—2 of FIG. 1;

FIG. 3 is a fragmentary sectional view taken generally along the line 3—3 of FIG. 2; and FIG. 4 is a perspective view of a retainer like that used in the cover ring and leveling screw assembly of FIGS. 1–3.

Description of the preferred embodiment

FIG. 1 shows a junction box 10 including a base plate 12, a pair of duct-receiving members or castings 14 adapted with the base plate 12 respectively to receive a pair of relatively small ducts (not shown), and an access unit 16 including a box 18 secured to the castings 14, a cover ring 20 adjustably mounted in the box 18, and a cover plate 22 secured to the cover ring 20 by a pair of screws 24.

A pair of relatively large ducts (not shown) are adapted to receive respectively in opposite sides of the junction box 10 between the castings 14 and between the base plate 12 and the box 18. Each casting 14 is provided with a plurality of grounding screws 26 for the ducts and is secured to an end portion of the base plate 12 by a plurality of screws 28 (FIG. 2). Opposite end portions of the box are secured respectively to the castings 14 by pairs of screws 30.

The base plate 12 is adjustably mounted on four screws 32, only one of which is shown in FIG. 1. Each screw 32 is provided with a slotted upper end portion and with a lower head portion (not shown) rotatably trapped between a pair of generally flat members 33 and 34 suitably secured together.

The cover ring 20 is provided with a foam rubber gasket 36 and is adjustably mounted in the box 18 by means of four screws 38 threaded through the bottom of the box 18, each casting 14 having a pair of recesses in which inner end portions of a pair of the screws 38 are respectively received, as shown in FIG. 2. The screws 38 are permanently assembled with the cover ring 20 respectively by a plurality of retainers 40, one of which is best shown in FIG. 4. Each retainer 40 is in the form of a flanged, split sleeve including a flange portion 40a and a body portion 40b having a pair of inwardly bent tongue portions 40c.

The cover ring 20 is provided with a plurality of holes through which the screws 38 respectively extend, each hole being provided with a plurality of portions of different diameters so as to provide the cover ring with a pair of upwardly facing annular surfaces 20a and 20b and a downwardly facing annular surface 20c in each hole (FIG. 3). The head portion of each screw 38 is formed with a plurality of portions of different diameters so as to provide each screw 38 with an upper downwardly facing surface 38a and a lower upwardly facing surface 38b.

In assembling the cover ring 20 to the box 18 of the access unit 16, first the screws 38 are threaded into the box 18 to a desired height. Then the cover ring 20 is lowered over the screws 38 until the surfaces 20c respectively engage the surfaces 38b. Finally, the retainers 40 are inserted into the cover ring 20 respectively over the head portions of the screws 38 until the body portions 40b respectively engage the surfaces 20b and the flange portions 40a respectively engage the surfaces 20A. During the installation of each of the retainers 40, the head portion of the respective screw 38 temporarily bends the tongue portions 40c outwardly toward alignment with the body portion 40b from which they are originally struck, but upon completion of the insertion, the tongue portions 40c resume their inwardly bent position and the free end portions thereof substantially engage the surface 38a of the respective screw 38.

After installation of the retainers 40, the screws 38 are free to rotate with respect to the cover ring 20, but axial movement thereof in an upward direction with respect to the cover ring 20 is limited by engagement of the surfaces 38b respectively with the surfaces 20c and axial movement thereof in a downward direction with respect to the cover ring 20 is limited by engagement of the surfaces 38a with the pairs of tongue portions 40c of the respective retainers 40. The engagement of the tongue portions 40c of each retainer 40 with the surface 38a of the respective screw 38 also locks the retainer 40 in place. The cover ring 20 may be alternatively raised and lowered by rotation of the screws 38 respectively in opposite directions and may be removed from the box 18 after the screws 38 are turned all the way out of the bottom of the box 18.

We claim:
1. A cover ring and leveling screw assembly for an underfloor wiring duct junction box, said assembly comprising a cover ring having a plurality of spaced holes extending therethrough, each of said holes having a plurality of portions of different diameters whereby said cover ring in each of said holes is provided with an upwardly facing surface and with a downwardly facing surface disposed below said upwardly facing surface, a plurality of leveling screws disposed respectively in said holes, a head portion of each of said screws having a plurality of portions of different diameters whereby each of said screws is provided with an upper downwardly facing surface and a lower upwardly facing surface, and a plurality of annular retainers disposed respectively in said holes and respectively surrounding the head portions of said screws, each of said retainers having an upwardly facing surface beneath the downwardly facing surface of its associated screw and a downwardly facing surface above the respective upwardly facing surface of the cover ring, one of said surfaces of each retainer being defined by a resilient radially movable portion thereof, axial movement of each of said screws in an upward direction with respect to said cover ring being limited by engagement of the lower upwardly facing surface of the screw with the respective downwardly facing surface of the cover ring and axial movement of each of said screws in a downward direction with respect to the cover ring being limited by engagement of the upper downwardly facing surface of the screw with the upwardly facing surface of the respective retainer and engagement of the downwardly facing surface of the respective retainer with the respectively upwardly facing surface of the cover ring.

2. An assembly as claimed in claim 1, wherein each retainer is a sleeve having a normally inwardly bent tongue portion the free end portion having an upper free edge face defining said upwardly facing surface of the retainer.

3. An assembly as claimed in claim 2, wherein each retainer is a split sleeve.

4. An assembly as claimed in claim 2, wherein each retainer is a flanged sleeve including a body portion having said normally inwardly bent tongue portion and an outwardly extending upper flange portion disposed adjacent and overlying an upper surface of said cover ring about the respective hole.

5. An assembly as claimed in claim 4, wherein each retainer is a flanged split sleeve.

6. An assembly as claimed in claim 1, wherein each of said retainers is a sleeve having a pair of generally opposite normally inwardly bent tongue portions each having an upper free edge face defining a portion of said upwardly facing surface of the retainer.

7. An assembly as claimed in claim 6, wherein each retainer is a split sleeve.

8. An assembly as claimed in claim 6, wherein each retainer is a flanged sleeve including a body portion having said pair of generally opposite normally inwardly bent tongue portions and an outwardly extending upper flange portion disposed adjacent and overlying an upper surface of said cover ring about the respective hole.

9. An assembly as claimed in claim 8, wherein each retainer is a flanged split sleeve.

References Cited

UNITED STATES PATENTS

| | | | |
|---|---|---|---|
| 1,533,759 | 4/1925 | Richardson et al. | 220—3.7 |
| 3,070,252 | 12/1962 | Reiland | 220—3.7 X |
| 3,338,450 | 8/1967 | Rose | 220—3.94 |

THERON E. CONDON, *Primary Examiner.*

J. R. GARRETT, *Assistant Examiner.*